Jan. 21, 1958 N. SWANSON 2,820,863

SOUND TAPE OPERATED SWITCHING MECHANISM

Filed April 25, 1955 2 Sheets-Sheet 1

INVENTOR.

Norman Swanson

BY

Singer, Stern & Carlberg

Attorneys

Jan. 21, 1958 N. SWANSON 2,820,863

SOUND TAPE OPERATED SWITCHING MECHANISM

Filed April 25, 1955 2 Sheets-Sheet 2

INVENTOR.
Norman Swanson
BY
Singer, Stern & Carlberg
Attorneys

United States Patent Office 2,820,863

Patented Jan. 21, 1958

2,820,863

SOUND TAPE OPERATED SWITCHING MECHANISM

Norman Swanson, Warrenville, Ill.

Application April 25, 1955, Serial No. 503,582

9 Claims. (Cl. 200—61.13)

The invention relates to a switch actuating device which is intended to be operated by a perforated magnetic sound tape during the time the sound tape is employed for sound reproduction.

It is an object of the invention to operate an electric switch by means operated by a perforated sound tape when the latter in a conventional tape recorder is unwound from its supply spool and moves past the sound reproducing head, that is, when the tape recorder is adjusted for "playing."

Another object of the invention is to operate an electric switch repeatedly after predetermined uniform periods of time by a gearing which is operated by a perforated sound tape when the latter in a conventional tape recorder is moved past the sound reproducing head when the tape recorder is adjusted for playing.

Still another object of the invention is to employ an electric switch which is normally open, and after having been closed by the means operated by a perforated magnetic sound tape is subsequently moved automatically, for instance, by a spring, again to its open position. The switch may be employed, for instance, for closing an electric circuit which controls the operation of a strip film picture projector in such a manner that each time the electric switch is closed, the picture advancing mechanism of the picture projector is operated one step to move the next picture on the film strip into a position in which the picture is projected onto a screen.

Other objects of the invention will be apparent or will be pointed out in the following description forming a part of this specification.

The drawings show by way of example a preferred embodiment of the invention and its application.

Figure 1:
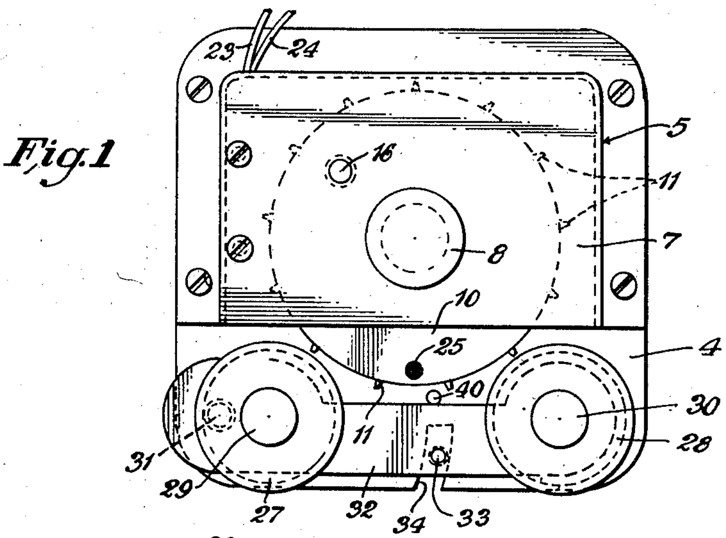
Fig. 1 is a top plan view of the sound tape operated switching device of the invention.
Figure 2:
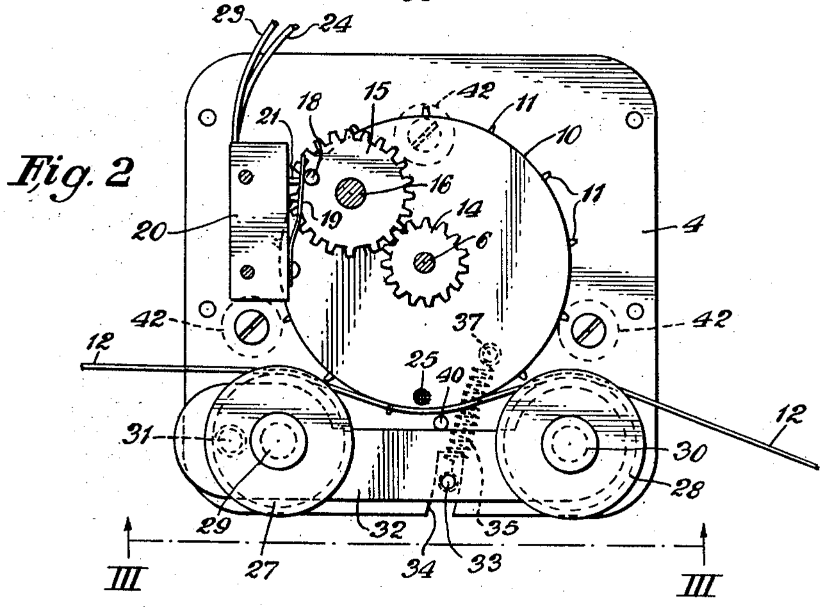
Fig. 2 is a similar view as Fig. 1, except that the cover has been removed.
Figure 4:
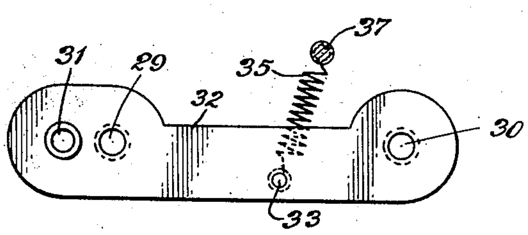
Fig. 4 is a detail view of the bar for supporting the two guide rollers.
Figure 5:
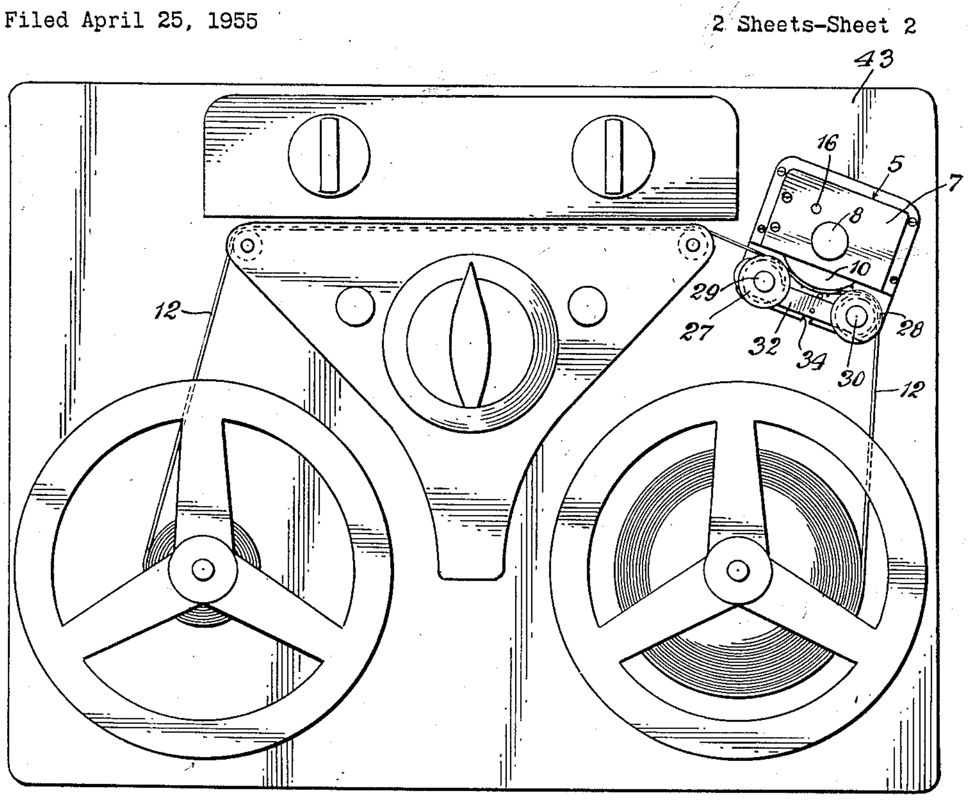
Fig. 5 shows a top view of the tape recorder having the switching device of the invention attached thereto.
Figure 3:
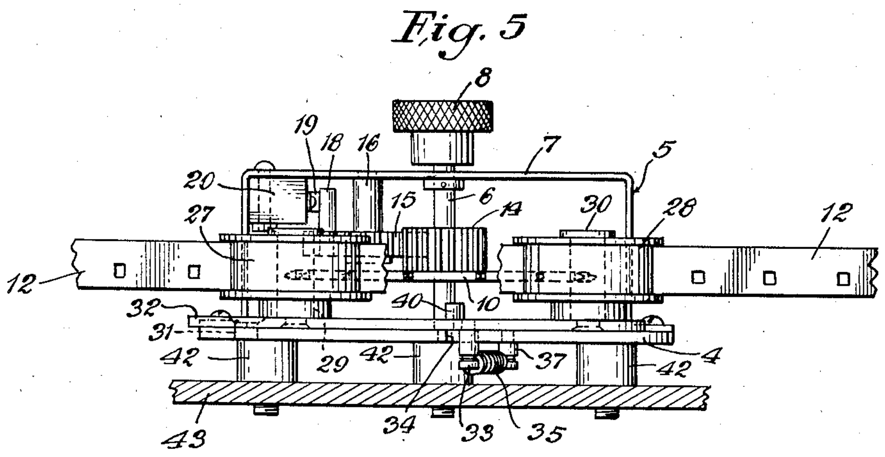
Fig. 3 is a side elevation view of the switching device along the line III—III of Fig. 2, but shows in addition thereto the mounting of the device to the top wall of a tape recorder.

Referring to the drawings, the switching device comprises a horizontal base plate 4 on the upper side of which is mounted a cap 5 forming a cover for the various moving parts of the device. In approximately the center of the plate 4 is rotatably mounted a vertical shaft 6 which extends upwardly through the top wall 7 of the cap 5 and has fixedly attached at its upper end a knurled knob 8 for manually rotating the shaft 6 at the start of the operation of the switching device. A sprocket disc 10 is fixedly attached to the shaft 6 within the cap 5 and the circumference of the sprocket disc 10 with its teeth 11 thereon projects through the open front wall of the cap 5 and is adapted to be engaged by the perforated magnetic sound tape 12 which rotates the sprocket disc 10 by engaging its teeth 11 when the tape moves from its supply spool to the sound head of a conventional tape recorder.

The shaft 6 has also secured thereon immediately above the sprocket disc 10 a gear 14 which meshes with a gear 15 on a vertical shaft 16 loosely rotatably mounted in a suitable bearing bracket and in the top wall 7 of the cap 5. A vertical pin 18 is attached to the gear 15 near its circumference and is adapted to engage and flex a leaf spring 19 once during each rotation of the gear 15. One end of the leaf spring 19 is attached to the outside of the housing of a microswitch 20 which has an outwardly extending axially slidable actuating pin 21 engaged by the free end of the leaf spring 19. When the leaf spring 19 is deflected by the pin 18 on the gear 15, the switch actuating pin 21 is pushed inwardly and closes the switch 20 which normally is open. The switch 20, in known manner, is spring-biased and is opened again automatically as soon as the pin 18 on the gear 15 has moved away from the leaf spring 19. The microswitch 20 is mounted within the cap 5 directly under the top wall 7 of the same and there are provided two outwardly going switch leads 23 and 24 which may be connected to an electric circuit to be controlled by the perforated magnetic sound tape, for instance, in a manner as described above to the picture advancing mechanism of a strip film projector. The gear transmission ratio may be selected, for instance, in such a manner that the switch 20 is actuated every three seconds when the magnetic sound tape travels with normal sound reproduction speed. Preferably, the sprocket disc 10 is provided with a mark 25 near its circumference for bringing the actuation of the switch 20 into proper relation with the start or other point of the sound track on the tape.

For the purpose of guiding the magnetic sound tape 12 into proper engagement with the sprocket disc 10, there are provided two spaced guide rollers 27 and 28 mounted loosely rotatable on two vertical shafts 29 and 30, respectively. Both rollers 27 and 28 are supported by means of their shafts 29 and 30 on a pivotally mounted carrier 32 having the shape of a bar resting loosely on top of the base plate 4. A pivot pin 31 to the left-hand side of the shaft 29 connects the bar 32 pivotally to the base plate 4. A pin 33 extends from the bar 32 downwardly through a slot 34 in the base plate 4 and has one end of a tension spring 35 attached thereto. The other end of the spring 35 is attached to a pin 37 on the lower face of the base plate 4. The spring 35 pulls the bar 32 and therewith the guide roller 28 in counterclockwise direction about the pivot pin 31 until the bar 32 engages a stop pin 40 on the upper side of the base plate 4. When manually moving the bar 32 in clockwise direction, both guide rollers 27 and 28 are moved away from the sprocket disc 10 and thereby facilitate the threading of the magnetic sound tape between the guide roller 27, 28 and the sprocket disc 10.

The base plate 4 is attached preferably by means of three distance members 42 in spaced relation from the top wall 43 of the tape recorder so that the teeth 11 of the sprocket disc 10 will be positioned in the same horizontal plane with the perforations in the perforated magnetic sound tape.

What I claim as my invention is:

1. An electric switching device adapted to be operated by a perforated magnetic sound tape, including a base plate, a sprocket to be engaged by the perforated magnetic sound tape and to be rotated thereby when the sound tape is moved lengthwise, means on said base plate for rotatably supporting said sprocket, a normally open switch supported by said base plate, a gear adapted to be driven by said sprocket, and an eccentric pin on said gear actuating said switch at uniformly spaced time intervals during the rotation of said sprocket.

2. An electric switching device adapted to be operated by a perforated magnetic sound tape, including a base plate, a sprocket to be engaged by the perforated magnetic sound tape and to be rotated thereby when the sound tape is moved lengthwise, means on said base plate for rotatably supporting said sprocket, a normally open switch supported by said base plate and having an operating pin for closing said switch when actuated, by said sprocket, and an eccentric pin on said gear for actuating said operating pin at uniformly spaced time intervals during the rotation of said sprocket.

3. An electric switching device adapted to be operated by a perforated magnetic sound tape, including a base plate, a sprocket to be engaged by the perforated magnetic sound tape and to be rotated thereby when the sound tape is moved lengthwise, means on said base plate for rotatably supporting said sprocket, a normally open switch supported by said base plate, a gear adapted to be driven by said sprocket, an eccentric pin on said gear for actuating said switch at uniformly spaced time intervals during the rotation of said sprocket, and two spaced parallel guide rollers for holding the perforated magnetic sound tape in engagement with said sprocket.

4. An electric switching device adapted to be operated by a perforated magnetic sound tape, including a base plate, a sprocket to be engaged by the perforated magnetic sound tape and to be rotated thereby when the sound tape is moved lengthwise, means on said base plate for rotatably supporting said sprocket, a normally open switch supported by said base plate and having an operating pin for closing said switch when actuated by said sprocket, an eccentric pin on said gear, a spring arm mounted in the path of said eccentric pin and arranged to engage said operating pin for actuating said operating pin at uniformly spaced time intervals during the rotation of said sprocket, and spaced parallel guide rollers for holding the perforated magnetic sound tape in engagement with a portion of the circumference of said sprocket.

5. An electric switching device adapted to be operated by a perforated magnetic sound tape, including a base plate, a sprocket to be engaged by the perforated magnetic sound tape and to be rotated thereby when the sound tape is moved lengthwise, means on said base plate for rotatably supporting said sprocket, an electric switch having a switch button, a spring arm in contactual engagement with said switch button, a gearing operated by said sprocket and, an eccentric pin on said gear for engaging said spring arm and operating said switch at uniformly spaced time intervals when said sprocket is rotated by said magnetic sound tape.

6. An electric switching device adapted to be operated by a perforated magnetic sound tape, including a base plate, a sprocket to be engaged by the perforated magnetic sound tape and to be rotated thereby when the sound tape is moved lengthwise, means on said base plate for rotatably supporting said sprocket, an electric switch having a switch button, a spring arm positioned to extend over said switch button, a gearing operated by said sprocket and, an eccentric pin on said gearing adapted to engage said spring arm for operating said switch at uniformly spaced time intervals when said sprocket is rotated by said magnetic sound tape, spaced parallel guide rollers for holding the perforated magnetic sound tape in engagement with a portion of the circumference of said sprocket and means for indexing said magnetic sound tape 7. An electric switching device adapted to be operated by a perforated magnetic sound tape, including a base plate, a sprocket to be engaged by the perforated magnetic sound tape and to be rotated thereby when the sound tape is moved lengthwise, means on said base plate for rotatably supporting said sprocket, an electric switch having a switch button, a spring arm positioned to extend over said switch button, a gearing operated by said sprocket and an eccentric pin on said gearing adapted to engage said spring arm for operating said switch at uniformly spaced time intervals when said sprocket is rotated by said magnetic sound tape, and spaced parallel guide rollers for holding the perforated magnetic sound tape in engagement with a portion of the circumference of said sprocket, a carrier on which said guide rollers are rotatably mounted, means for pivotally attaching said carrier to said base plate, and means for yieldably urging said carrier in a direction in which said guide rollers hold the magnetic sound tape in engagement with the circumference of said sprocket.

8. An electric switching device adapted to be operated by a perforated magnetic sound tape, including a base plate, a sprocket to be engaged by the perforated magnetic sound tape and to be rotated thereby when the sound tape is moved lengthwise, a cap attached to said base plate, a shaft rotatably supported in said base plate and said cap, said sprocket being fixedly secured to said shaft to be arranged at least in part within said cap, one side of which is open to permit a portion of the sprocket to project outwardly to be engaged by the perforated magnetic sound tape, an electric switch within said cap having a switch button, a spring arm extending over said switch button, a gear wheel drivingly connected to said sprocket, an eccentric pin on said gear wheel adapted to engage said spring arm for actuating said switch button and switch at uniformly spaced time intervals during the rotation of said sprocket by said magnetic sound tape and means for indexing said sprocket relative to said magnetic sound tape.

9. An electric switching device adapted to be operated by a perforated magnetic sound tape, including a base plate, a sprocket to be engaged by the perforated magnetic sound tape and to be rotated thereby when the sound tape is moved lengthwise, a cap attached to said base plate, a shaft rotatably supported in said base plate and said cap, said sprocket being fixedly secured to said shaft to be arranged at least in part within said cap one side of which is open to permit a portion of the sprocket to project outwardly to be engaged by the perforated magnetic sound tape, an electric switch within said cap, a switch button on said switch, a spring arm extending over said switch button, a gear wheel drivingly connected to said sprocket, and an eccentric pin on said gear wheel adapted to periodically engage such spring arm for actuating said switch at uniformly spaced time intervals during the rotation of said sprocket by said magnetic sound tape, said shaft extending outwardly from said cap and having fixedly attached to its outer end a manually operating knob for adjusting said sprocket to a predetermined position with respect to the sound track on said magnetic sound tape, and an indicating mark on said sprocket.

References Cited in the file of this patent

UNITED STATES PATENTS

| | | |
|---|---|---|
| 1,847,075 | Allen et al. | Mar. 1, 1932 |
| 2,195,394 | Anderson | Apr. 2, 1940 |
| 2,560,395 | Steed | July 10, 1951 |
| 2,574,688 | Camras | Nov. 13, 1951 |
| 2,668,263 | Bennett | Feb. 2, 1954 |